US009236802B2

(12) United States Patent
Shehu et al.

(10) Patent No.: US 9,236,802 B2
(45) Date of Patent: Jan. 12, 2016

(54) TURBO CIRCUIT FOR PROVIDING VOLTAGE REGULATION AND RELATED METHOD

(75) Inventors: Edvin Shehu, Providence, RI (US); Dan Clavette, Greene, RI (US)

(73) Assignee: Infineon Technologies Americas Corp., El Segundo, CA (US)

( * ) Notice: Subject to any disclaimer, the term of this patent is extended or adjusted under 35 U.S.C. 154(b) by 445 days.

(21) Appl. No.: 12/798,765

(22) Filed: Apr. 9, 2010

(65) Prior Publication Data

US 2011/0248692 A1 Oct. 13, 2011

(51) Int. Cl.
*G05F 1/00* (2006.01)
*H02M 3/158* (2006.01)
*G05F 1/577* (2006.01)

(52) U.S. Cl.
CPC ............. *H02M 3/1584* (2013.01); *G05F 1/577* (2013.01); *H02M 3/1588* (2013.01)

(58) Field of Classification Search
CPC .................. H02M 2001/009; H02M 3/33561; H02M 3/155; H02M 2001/0045; H02M 3/1584; H02M 3/1588; G05F 1/577
USPC ................................................. 323/267–272
See application file for complete search history.

(56) References Cited

U.S. PATENT DOCUMENTS

| | | | |
|---|---|---|---|
| 6,404,175 B1 * | 6/2002 | Yang et al. ..................... 323/282 |
| 6,696,882 B1 * | 2/2004 | Markowski et al. .......... 327/531 |
| 6,879,138 B2 * | 4/2005 | Dinh et al. ..................... 323/284 |
| 7,274,182 B2 | 9/2007 | Huang |
| 7,521,913 B2 | 4/2009 | Tang |
| 7,541,794 B2 | 6/2009 | Tabaian |
| 7,592,789 B2 * | 9/2009 | Jain ............................... 323/276 |
| 7,661,439 B2 * | 2/2010 | Chester et al. ............. 137/487.5 |
| 2007/0188222 A1 * | 8/2007 | Nguyen .......................... 330/10 |
| 2008/0129259 A1 * | 6/2008 | Endo et al. ..................... 323/271 |
| 2009/0278513 A1 * | 11/2009 | Bahramian et al. ........... 323/217 |

\* cited by examiner

*Primary Examiner* — Jeffrey Gblende
(74) *Attorney, Agent, or Firm* — Farjami & Farjami LLP

(57) ABSTRACT

According to one embodiment, a turbo circuit for increasing an output of a voltage regulator having a several power stages includes an activation sub-circuit coupled to a feedback signal of the voltage regulator, the activation sub-circuit being configured to generate a multi-stage ON signal for turning on the power stages substantially concurrently. The turbo circuit further comprises a deactivation sub-circuit coupled to the feedback signal, the deactivation sub-circuit being configured to cancel the multi-stage ON signal when the feedback signal reaches an extremum value. In one embodiment, the turbo circuit may be implemented in a multi-phase buck converter fabricated as part of an integrated circuit on a semiconductor die. In another embodiment, the turbo circuit can be implemented in a multi-phase boost converter as part of an integrated circuit on a semiconductor die.

18 Claims, 3 Drawing Sheets

TURBO CIRCUIT FOR PROVIDING VOLTAGE REGULATION AND RELATED METHOD

DEFINITION

In the present application, "group III-V semiconductor" refers to a compound semiconductor that includes at least one group III element and at least one group V element, such as, but not limited to, gallium nitride (GaN), gallium arsenide (GaAs), aluminum gallium arsenide (AlGaAs), indium gallium nitride (InGaN) and the like. Analogously, "III-nitride semiconductor" refers to a compound semiconductor that includes nitrogen and at least one group III element, such as, but not limited to, GaN, AlGaN, InN, AlN, InGaN, InAlGaN and the like.

BACKGROUND OF THE INVENTION

1. Field of the Invention

The present invention is generally in the field of electrical circuits and systems. More specifically, the present invention is in the field of voltage regulation in electrical circuits and systems.

2. Background Art

Voltage regulators are widely used in a variety of modern electronic devices and systems. Many integrated circuit (IC) applications, for example, require conversion of a DC input signal to a lower, or higher, DC output, in order to drive one or more circuit components. For example, a buck converter may be implemented as a voltage regulator to convert a higher voltage DC input to a lower voltage DC output for use in low voltage applications in which relatively large load currents are required.

One conventional approach to implementing a voltage regulator, such as a buck converter, for example, includes utilizing several power stages in a multi-phase arrangement. In that arrangement, each power stage is sequentially activated in a phase delayed manner by a control circuit of the voltage regulator, thereby distributing current production across the several output power stages. Because voltage regulators are increasingly called upon to provide stable voltage outputs to electronic systems, such as a microprocessor for example, having a wide range of current requirements, the ability to provide effective transient response is an important performance parameter of voltage regulators.

A conventional approach to providing transient response in a multi-phase voltage regulator includes using a feedback circuit with an error amplifier to compare the output voltage of the voltage regulator with a reference voltage. When the load demands on the voltage regulator require an increase in output, for example, the error amplifier may respond by increasing the power stage duty cycle in order to provide more energy to the output capacitors. However, this conventional approach suffers from several drawbacks.

One disadvantage of the conventional approach is latency owing to the delay between the occurrence of the load transient and the next phased switching pulse. In addition, the amount of energy transferred in a single switching pulse is typically inadequate to meet the output demands on the voltage regulator. As a result, the conventional approach typically relies on several output capacitors to store the energy necessary for effective transient response. As the transient requirements on voltage regulators become ever more stringent, progressively more output capacitors are required under the conventional arrangement. However, incorporation of additional output capacitors is expensive and inefficient, both in terms of monetary cost and the circuit area required for their implementation.

Thus, there is a need to overcome the drawbacks and deficiencies in the art. There is a need in the art, for example, for a voltage regulator that can provide a transient response meeting or exceeding transient requirements, while reducing the number of output capacitors compared to conventional voltage regulators providing a comparable transient response.

SUMMARY OF THE INVENTION

The present invention is directed to a turbo circuit for providing voltage regulation and related method, substantially as shown in and/or described in connection with at least one of the figures, as set forth more completely in the claims.

DETAILED DESCRIPTION OF THE INVENTION

Figure 1:
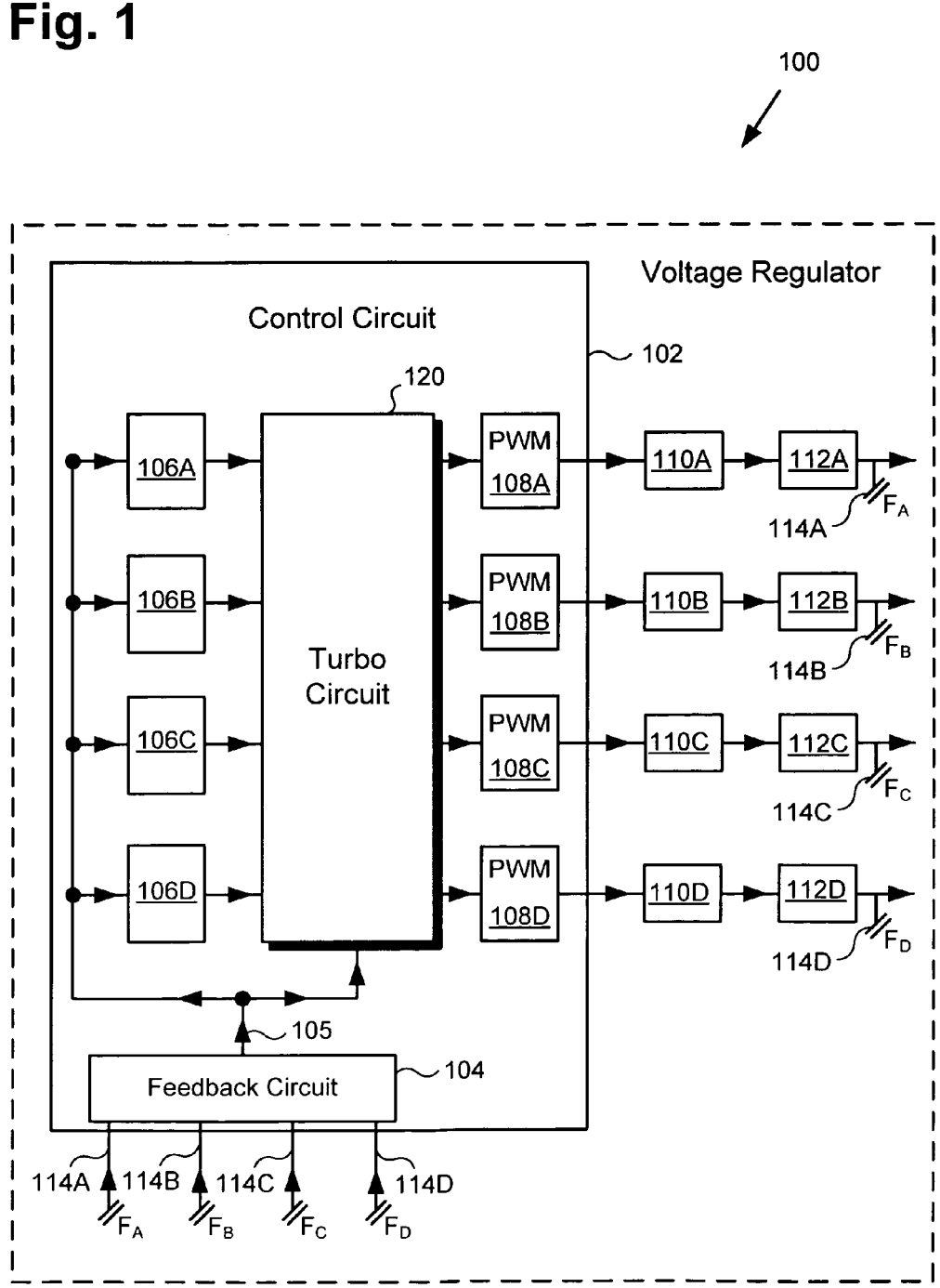
FIG. 1 is a block diagram showing selected features of a voltage regulator including a turbo circuit, according to one embodiment of the present invention.

The present invention is directed to a turbo circuit for providing voltage regulation and related method. Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 is a block diagram showing a portion of voltage regulator 100 including turbo circuit 120, according to one embodiment of the present invention. Voltage regulator 100, which is shown in a multi-phase implementation, may be fabricated as part of an integrated circuit (IC), for example, to provide voltage conversion and regulation for one or more IC components. In the interest of conceptual clarity, only selected features of voltage regulator 100 are shown. Other features typically found in a voltage regulator, such as output inductors and output capacitors, for example, are not expressly shown in FIG. 1, but are well known in the art. It is noted that although the embodiment of FIG. 1 will be described in terms of a multi-phase buck converter, one of ordinary skill in the art will recognize that voltage regulator 100 can be suitably configured for implementation as a multi-phase boost converter as well.

As shown in FIG. 1, in one embodiment, voltage regulator 100 is a four phase voltage regulator comprising control circuit 102 including turbo circuit 120, output drivers 110A, 110B, 110C, and 110D (hereinafter output drivers 110A-110D), and plurality of power stages 112A, 112B, 112C, and 112D (hereinafter power stages 112A-112D) driven respectively by output drivers 110A-110D. In addition to turbo circuit 120, control circuit 102 is shown to comprise pulse generators 106A, 106B, 106C, and 106D (hereinafter pulse generators 106A-106D), respective pulse width modulators (PWMs) 108A, 108B, 108C, and 108D (hereinafter PWMs 108A-108D), and feedback circuit 104.

As further shown in FIG. 1, feedback circuit 104 receives output voltages 114A, 114B, 114C, and 114D (hereinafter output voltages 114A-114D) provided by respective power stages 112A-112D as inputs, and provides feedback signal 105 to turbo circuit 120 and pulse generators 106A-106D. Feedback circuit 104 may comprise an error amplifier, for example, configured to identify voltage transients by comparing one or more of output voltages 114A-114D to a reference voltage. In that instance, feedback signal 105 may be the output of the error amplifier, for example. It is noted that although voltage regulator 100 is shown in FIG. 1 in a four phase implementation, that representation is provided merely as an example. In other embodiments, voltage regulator 100 may include more than, or fewer than, the four power stages depicted in FIG. 1.

As discussed above, one disadvantage of conventional voltage regulator implementations is the latency of the transient response resulting from the delay between the occurrence of a load transient and the next phased switching pulse. In addition, the amount of energy transferred in a single switching pulse through a single power stage is typically inadequate to meet the output demands on the voltage regulator during a transient event. As a result, the conventional voltage regulator circuits typically rely on costly and space inefficient output capacitors to store the energy necessary for effective transient response.

Voltage regulator 100, shown in FIG. 1, overcomes the drawbacks and deficiencies of conventional voltage regulator circuits by including turbo circuit 120. As will be explained more fully by reference to FIGS. 2 and 3, turbo circuit 120 is configured to temporarily increase the output of voltage regulator 100 by providing a multi-stage ON signal to all of power stages 112A-112D substantially concurrently in response to a measured transient. The increased output of voltage regulator 100 is temporary because turbo circuit 120 is further configured to cancel the multi-stage ON signal at an appropriate juncture to optimize the transient response performance of voltage regulator 100.

In one embodiment, turbo circuit 120 can be a stand alone circuit that is interfaced with control circuit 102, for example. In some embodiments, as shown for example in FIG. 1, turbo circuit 120 can be integrated with control circuit 102, such as by being fabricated on a common semiconductor wafer or die as part of an IC. Depending upon its implementational environment, turbo circuit 120 may be fabricated using a group IV semiconductor such as silicon and/or germanium, or turbo circuit 120 may be fabricated using a III-nitride semiconductor like gallium nitride (GaN) or a group III-V semiconductor such as gallium arsenide (GaAs), for example. In other embodiments, turbo circuit 120 may be fabricated using any suitable group III-V semiconductor as defined above. For instance, turbo circuit 120 may be fabricated as part of an IC including voltage regulator 100, wherein voltage regulator 100 comprises a plurality of group III-V semiconductor based switching devices as part of power stages 112A-112D.

Figure 2:
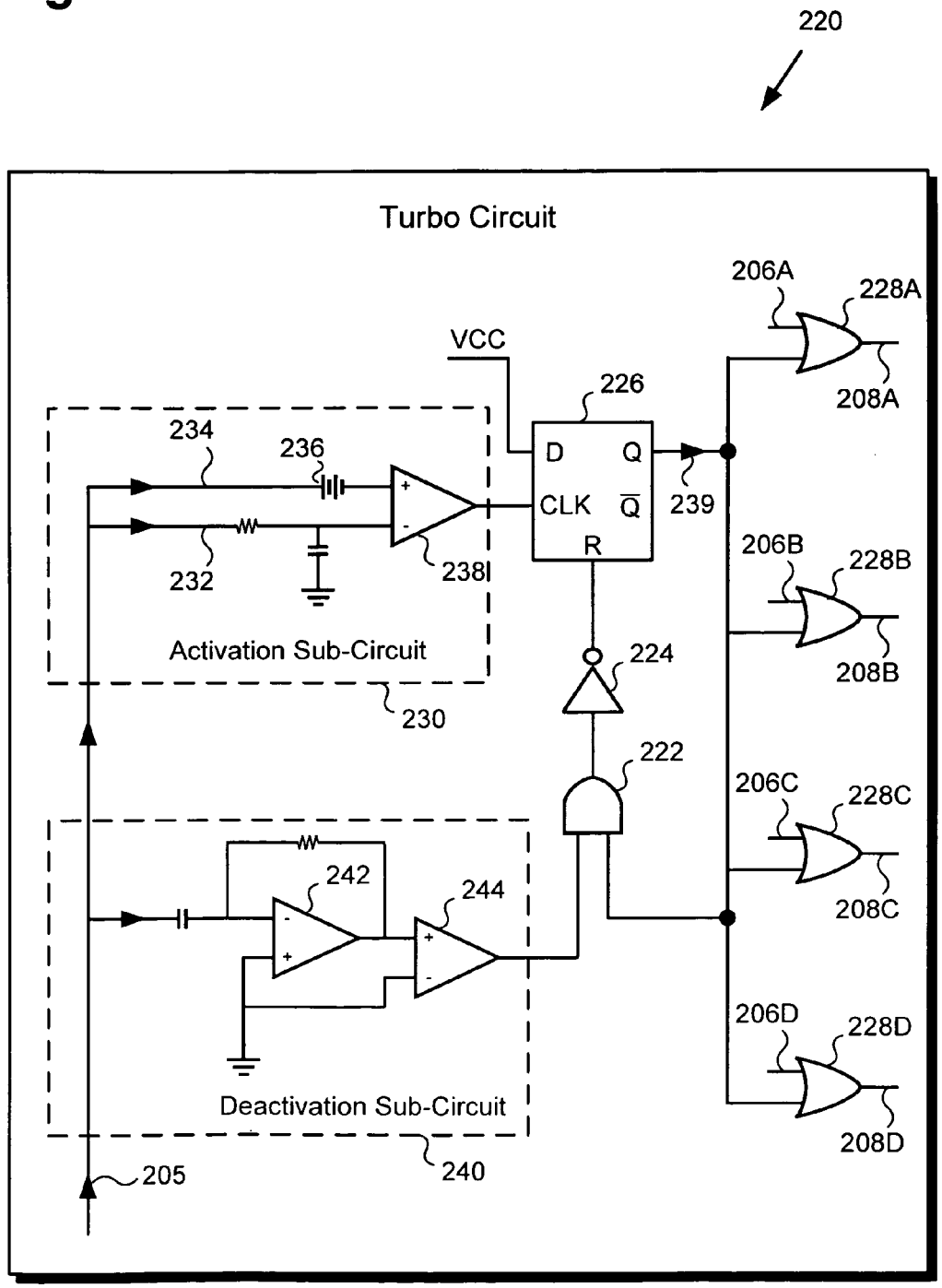
FIG. 2 is a conceptual block diagram showing a more detailed representation of a turbo circuit configured to temporarily increase the output of a voltage regulator, according to one embodiment of the present invention.

Turning to FIG. 2, FIG. 2 is a conceptual block diagram showing a more detailed representation of a turbo circuit configured to temporarily increase the output of a voltage regulator, according to one embodiment of the present invention. Turbo circuit 220 receiving feedback signal 205 and providing outputs 208A, 208B, 208C, and 208D (hereinafter outputs 208A-208D) from respective OR gates 228A, 228B, 228C, and 228D (hereinafter OR gates 228A-228D) corresponds to turbo circuit 120 receiving feedback signal 105 and providing outputs to respective PWMs 108A-108D, in FIG. 1. As shown in FIG. 2, turbo circuit 220 comprises activation sub-circuit 230, deactivation sub-circuit 240, AND gate 222, inverter 224, and turbo control latch 226, in addition to OR gates 228A-228D. Also shown in FIG. 2 is multi-stage ON signal 239 serving as one of the inputs to each of OR gates 228A-228D when turbo circuit 220 is activated.

Figure 3:
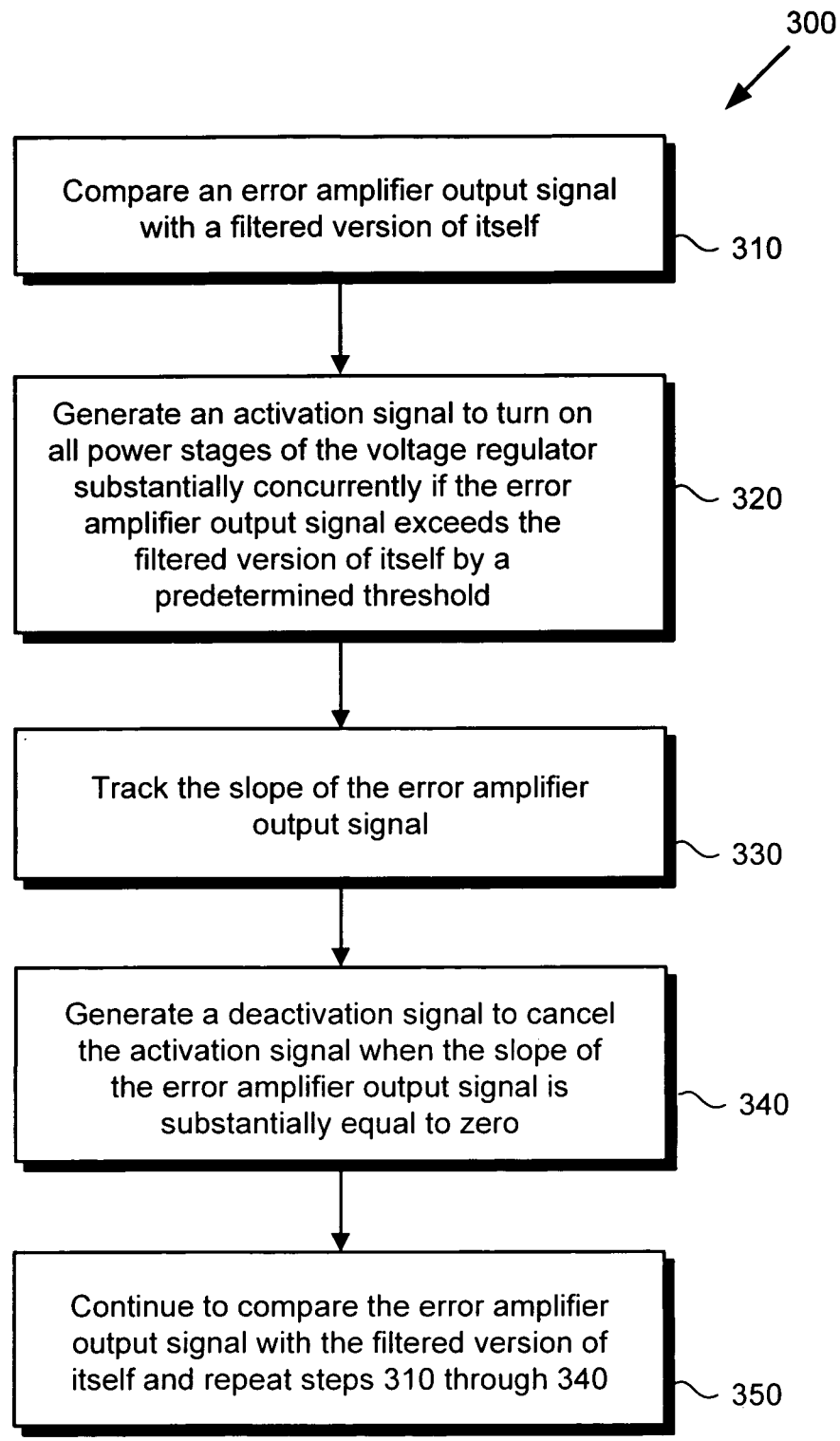
FIG. 3 shows a flowchart presenting a method for temporarily increasing the output of a voltage regulator, according to one embodiment of the present invention.

The operation of example turbo circuit 220 will be described in combination with FIG. 3. FIG. 3 presents flowchart 300 describing one embodiment of a method for temporarily increasing the output of a voltage regulator, such as voltage regulator 100, in FIG. 1. Certain details and features have been left out of flowchart 300 that are apparent to a person of ordinary skill in the art. For example, a step may comprise one or more substeps or may involve specialized equipment or materials, as known in the art. While steps 310 through 350 indicated in flowchart 300 are sufficient to describe one embodiment of the present invention, other embodiments of the invention may utilize steps different from those shown in flowchart 300, or may comprise more, or fewer, steps.

Step 310 of flowchart 300 comprises comparing an error amplifier output signal with a filtered version of itself. Referring to turbo circuit 220, in FIG. 2, step 310 of flowchart 300 may be performed by activation sub-circuit 230 of turbo circuit 220. Recalling that feedback signal 205 may comprise the output signal of an error amplifier included in feedback circuit 104, shown in FIG. 1, activation sub-circuit 230, in FIG. 2, receives feedback signal 205, which may be an error amplifier output signal, as an input. Feedback signal 205 is filtered along path 232, and the filtered feedback signal is provided to the negative input of comparator 238. Unfiltered feedback signal 205 travels along path 234 and encounters voltage source 236, which is coupled to the positive input of comparator 238.

Continuing with step 320, in FIG. 3, step 320 of flowchart 300 comprises generating an activation signal to turn on all power stages of the voltage regulator substantially concurrently if the error amplifier output signal exceeds the filtered version of itself by a predetermined threshold. Referring to FIG. 2, a transient component of feedback signal 205 is filtered out along path 232, but is retained by the signal traveling along path 234. When the transient component of feedback signal 205 exceeds the filtered version of feedback signal 205 supplied to the negative input of comparator 238 by a predetermined threshold set by voltage source 236, such as approximately 260 mV DC, for example, the output of comparator 238 goes HIGH, thereby generating multi-stage ON signal 239.

According to the embodiment of FIG. 2, step 320 of flowchart 300 results in generation of multi-stage ON signal 239, which causes all of the outputs 208A-208D of respective OR gates 228A-228D to go HIGH, for example. As previously explained, outputs 208A-208D of OR gates 228A-228D correspond respectively to the outputs provided from turbo circuit 120 to respective PWMs 108A-108D, in FIG. 1. Consequently, generation of multi-stage ON signal 239 by activation sub-circuit 230 and turbo control latch 226, in FIG. 2, results in substantially concurrent activation of all of power stages 112A-112D of voltage regulator 100, in FIG. 1.

Moving on to step 330 of FIG. 3, step 330 of flowchart 300 comprises tracking the slope of the error amplifier output signal. Referring once again to turbo circuit 220, in FIG. 2, step 330 corresponds to the operation of differentiator 242 included in deactivation sub-circuit 240. As shown in FIG. 2, feedback signal 205, e.g., an error amplifier output signal, is provided as an input to deactivation sub-circuit 240, where its slope can be determined by differentiation of feedback signal 205 with respect to time, by differentiator 242.

Continuing with step 340 of flowchart 300, step 340 comprises generating a deactivation signal to cancel the activation signal, e.g., multi-stage ON signal 239, when the slope of the error amplifier signal is substantially equal to zero. As shown in FIG. 2, step 340 of flowchart 300 may correspond to coupling the output of differentiator 242 to the positive input of zero cross detector 244 of deactivation sub-circuit 240. As is well understood in the art, a substantially zero slope for feedback signal 205 occurs when feedback signal 205 reaches an extremum value, such as a maximum value of the error amplifier output signal, for example. When such an extremum value is reached by feedback signal 205, zero cross detector 244 senses the substantially zero slope and provides a HIGH output from deactivation sub-circuit 240.

According to the embodiment of FIG. 2, the output of deactivation sub-circuit 240 is coupled to the reset input of turbo control latch 226 through AND gate 222, which receives the Q output of turbo control latch 226 as a second input, and inverter 224. Thus, when turbo control latch 226 is outputting multi-stage ON signal 239 and feedback signal 205 reaches an extremum value, the output of AND gate 222 goes HIGH, causing turbo control latch 226 to cancel the concurrent activation of all power stages provided by multi-stage ON signal 239.

Steps 310 through 340 of flowchart 300 describe an example method by which turbo circuit 120, in FIG. 1, can improve the transient response of voltage regulator 100 by temporarily turning on all of power stages 112A-112D substantially concurrently. Referring to step 350 of flowchart 300, step 350 comprises continuing to compare feedback signal 105 to a filtered version of itself and repeating steps 310 through 340 as necessary to respond effectively to transient events.

As shown in FIGS. 1 and 2, in some embodiments, turbo circuit 120/220 can be interfaced with control circuit 102 of voltage regulator 100 such that the normal operation of control circuit 102 is substantially unaffected by deactivation of turbo circuit 120/220 by deactivation sub-circuit 240. For example, the arrangement of turbo circuit 220 is such that inputs 206A, 206B, 206C, and 206D (hereinafter inputs 206A-206D), corresponding respective to signals from pulse generators 106A-106D in FIG. 1, are paired with the output of turbo control latch 226 as dual inputs to respective OR gates 228A-228D. Consequently, upon deactivation of turbo circuit 220, through cancellation of multi-stage ON signal 239, for example, outputs 208A-208D of respective OR gates 228A-228D are determined by respective inputs 206A-206D. Because inputs 206A-206D correspond to signals provided by respective pulse generators 106A-106D, shown in FIG. 1, in the course of normal operation of control circuit 102, that normal operation is substantially unaffected by deactivation of turbo circuit 120.

As may be apparent from the foregoing, various embodiments of the present invention provide numerous advantages over conventionally configured voltage regulators. For example, by utilizing a turbo circuit including an activation sub-circuit configured to respond rapidly to a detected transient, embodiments of the present invention avoid the latency associated with transient response in conventional implementations. In addition, by turning ON all power stages of a multi-phase voltage regulator substantially concurrently in response to a detected transient, embodiments of the present invention enable maximum output when it is most needed. Moreover, by utilizing a deactivation sub-circuit of the turbo circuit to return control over the voltage regulator power stages to the normal operation of the voltage regulator control circuit when a feedback signal reaches an extremum value, embodiments of the present invention enable the transient response to be optimally controlled so as to avoid overshoot and maintain voltage output within the strict tolerances demanded by modern electronic circuits and systems.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

The invention claimed is:

1. A turbo circuit for increasing an output of a voltage regulator having a plurality of power stages, said turbo circuit comprising:
    an activation sub-circuit coupled to a feedback signal of said voltage regulator, said activation sub-circuit configured to generate a multi-stage ON signal for turning on all of said plurality of power stages by comparing said feedback signal, from which a transient component is not removed, to said feedback signal from which said transient component is removed, said activation sub-circuit configured to generate said multi-stage ON signal when said feedback signal exceeds said feedback signal from which said transient component is removed by a predetermined threshold;
    a deactivation sub-circuit coupled to said feedback signal, said deactivation sub-circuit configured to cancel said multi-stage ON signal when said feedback signal has a substantially zero slope.

2. The turbo circuit of claim 1, wherein said multi-stage ON signal turns on said plurality of power stages substantially concurrently.

3. The turbo circuit of claim 1, wherein said feedback signal comprises an output of an error amplifier of said voltage regulator.

4. The turbo circuit of claim 1, wherein said de-activation sub-circuit is configured to cancel said multi-stage ON signal when said feedback signal reaches a maximum value.

5. The turbo circuit of claim 1, wherein said voltage regulator comprises a multi-phase buck converter.

6. The turbo circuit of claim 1, wherein said voltage regulator comprises a multi-phase boost converter.

7. The turbo circuit of claim 1, wherein said turbo circuit is interfaced with a control circuit of said voltage regulator such that operation of said control circuit is substantially unaffected by deactivation of said turbo circuit.

8. The turbo circuit of claim 1, wherein said turbo circuit is integrated with a control circuit of said voltage regulator.

9. The turbo circuit of claim 1, wherein said voltage regulator comprises a plurality of group III-V semiconductor devices.

10. An integrated circuit (IC) fabricated on a semiconductor die and including a voltage regulator having a turbo circuit for increasing an output of said voltage regulator, said semiconductor die comprising:
   an activation sub-circuit coupled to a feedback signal of said voltage regulator, said activation sub-circuit configured to generate an ON signal for turning on all power stages of said voltage regulator by comparing said feedback signal, from which a transient component is not removed, to said feedback signal from which said transient component is removed, said activation sub-circuit configured to generate said ON signal when said feedback signal exceeds said feedback signal from which said transient component is removed by a predetermined threshold;
   a deactivation sub-circuit coupled to said feedback signal, said deactivation sub-circuit configured to cancel said ON signal when said feedback signal has a substantially zero slope.

11. The integrated circuit of claim 10, wherein said voltage regulator comprises a multi-phase buck converter.

12. The integrated circuit of claim 10, wherein said voltage regulator comprises a multi-phase boost converter.

13. A method for increasing an output of a voltage regulator having a plurality of power stages, said method comprising:
   generating, from air activation sub-circuit, a multi-stage ON signal for turning on all of said plurality of power stages by comparing a feedback signal of said voltage regulator, from which a transient component is not removed, to said feedback signal from which said transient component is removed and generating said multi-stage ON signal when said feedback signal exceeds said feedback signal from which said transient component is removed by a predetermined threshold;
   tracking said feedback signal of said voltage regulator;
   canceling, using a deactivation sub-circuit, said multi-stage ON signal when said feedback signal has a substantially zero slope.

14. The method of claim 13, wherein said method is performed by a turbo circuit interfaced with a control circuit of said voltage regulator.

15. The method of claim 13, wherein tracking said feedback signal of said voltage regulator comprises tracking an output of an error amplifier of said voltage regulator.

16. The method of claim 13, wherein canceling said multi-stage ON signal comprises canceling said multi-stage ON signal when said feedback signal reaches a maximum value.

17. The method of claim 13, wherein said voltage regulator comprises a multi-phase buck converter.

18. The method of claim 13, wherein said voltage regulator comprises a multi-phase boost converter.

* * * * *